July 2, 1929.  J. K. DOLAN  1,719,104
RABBIT HUTCH FEEDING APPARATUS
Filed April 19, 1926
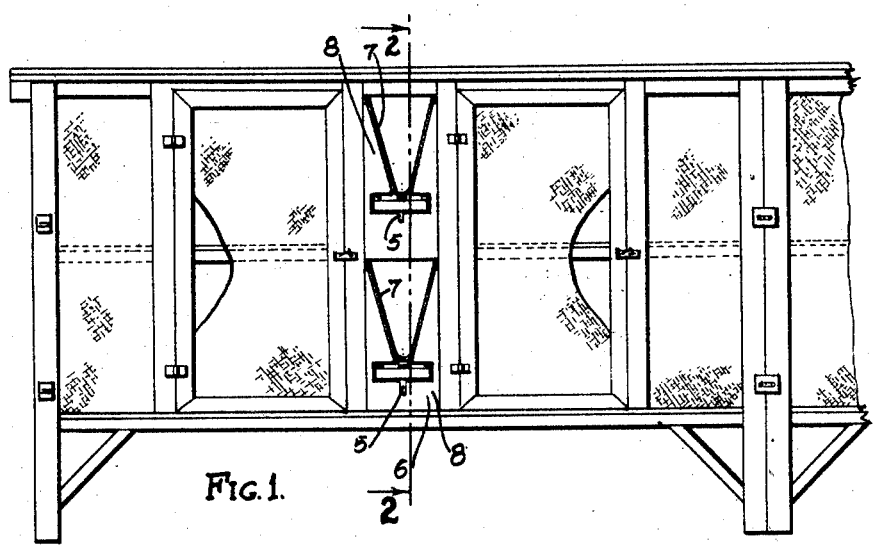
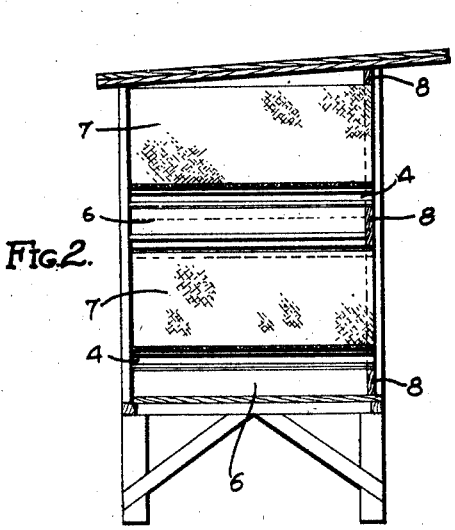
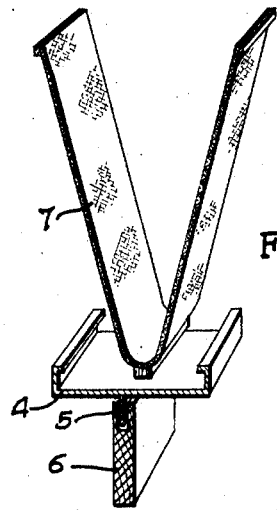
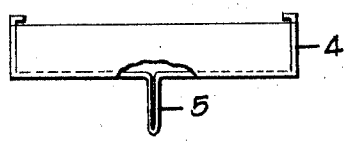
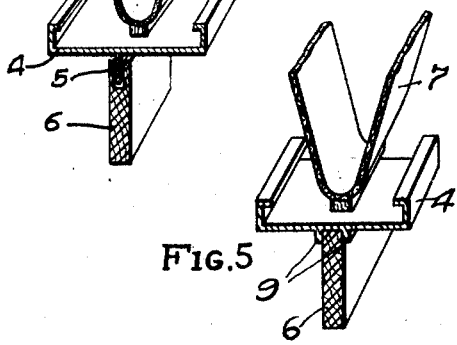
INVENTOR.
JOHN K. DOLAN
BY
A. B. Bowman
ATTORNEY.

Patented July 2, 1929.

1,719,104

UNITED STATES PATENT OFFICE.

JOHN K. DOLAN, OF LOS ANGELES, CALIFORNIA.

RABBIT-HUTCH FEEDING APPARATUS.

Application filed April 19, 1926. Serial No. 102,877.

My invention relates to rabbit hutch feeding apparatus, more particularly to that class in which hay racks are permanently fixed, and where the feed trough acts in unison with the hay rack and said feed trough is removable and readily accessible for the cleaning or filling thereof, and the objects of my invention are: first, to provide a rabbit hutch with a hay rack mounted permanently therein which may be open for filling and which need not be removed when cleaning the feed trough; second, to provide a feed trough for a rabbit hutch which will catch the siftings or small particles of hay, etc., from the hay rack, and which will be easily accessible or removable; and readily cleaned or filled with feed; and, third, to provide a device of this class which is very simple and economical of construction and operation.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of references thereon which form a part of this application in which:

Figure 1 is a front elevational view of my rabbit hutch shown abutted to another such rabbit hutch and connected thereto, and showing the end view of the hay racks and feed troughs as the partition therein. Fig. 2 is a sectional view through 2—2 of Fig. 1 showing the upper and lower sections thereof, and showing a side view of the hay racks and fed troughs therein. Fig. 3 is a perspective sectional view of my rack and fed trough, and shows their relation and combination with each other; Fig. 4 shows an end view of the fed trough and Fig. 5 is a view similar to Fig. 3 showing the relation of the trough and its support in slightly modified form.

Similar characters of reference refer to similar parts and portions throughout the several views of the drawings.

The hay rack 7, trough 4, the trough support and base member 6, and the sliding rib support member 5 constitute the principal parts and portions of my apparatus.

The hay rack 7 is preferably composed of wire mesh, curved at its lower edge, and it is built in to the rabbit hutch and secured at its ends to the edges of the board 8 and it is provided with a longitudinal support 9 at its lower edge. A trough 4, preferably metal, is positioned longitudinally beneath the lower side of the hay rack 7, the longitudinal center line of said hay rack 7 being parallel to the longitudinal center line of the said trough 4. This trough 4 has, as a portion of it, a slide rib 5 which is made to fit in a groove, said groove being in the trough support base member 6. The groove and rib 5 are parallel to the longitudinal center line of the trough 4 and to the longitudinal center line of the hay rack 7. The trough support base member 6 is firmly secured to the rabbit hutch to meet the above conditions. It will be noted that as the hay rack 7 is permanently fixed and a part of the rabbit hutch, the rabbit hutch is a part of the hay rack 7 in forming an end wall by the placing of the hay rack 7 against the rear wall of the said rabbit hutch, yet one or both ends of the hay rack 7 may be open. Similarly the rabbit hutch may form an end block to the feed trough 4, or the feed trough 4 may be provided with end pieces at its opposite ends as desired. The hay rack 7 being perforate allows small hay or small grains, etc., to sift through and out of the hay rack. Since the feed trough is immediately below, the small hay, grains, etc., are collected therein. The trough extends from both sides of the hay rack, the hay rack erected above it, and both ray rack and trough being immediately between the two pens of rabbits, the rabbits have full and proper access to feed themselves on both sides of the hay racks and troughs.

In the modified form of construction shown in Fig. 5, the construction is the same except that the feed trough 4 and support 6 are modified in their slidable relation, the support 6 being solid and having no slot in its upper edge and the trough 4 having two extended ribs 9 positioned on opposite sides of the support 6 and slidable relatively to said support 6.

Thus it will be seen that one of the advantages of this invention lies in the fact that the feed trough 4 may be pulled out of the rabbit hutch and cleaned in a moment, filled with food and returned to proper position for the healthy feeding of the rabbits. Another great advantage lies in the fact that the small grains, small hay, etc., are collected in the said trough for the feeding of the rabbits instead of being obliterated as bedding when the rabbits pull hay from the said hay rack. A further great advantage lies in the fact that the hay rack need not be removed to keep the feed trough clean for the healthy feeding of rabbits.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. A rabbit hutch, having as a part thereof a sliding feed trough, said feed trough constructed with a rib projection extending at right angles to the bottom transverse and along and under the longitudinal center line of the trough bottom, said hutch having a base member projecting upwardly from the bottom of and secured to the rabbit hutch, said base member extending the entire length of said trough and dividing the hutch into separate rabbit compartments, said base member having a longitudinal vertical groove on its upper face in which the said rib projection is free to slide.

2. In a hutch of the class described, a vertical partition member dividing the hutch into separate feed compartments, and a slidable trough member provided with an extended portion adapted to engage the upper edge of said partition member, the upper edge of said partition member supporting and guiding said trough.

3. In a hutch of the class described, a vertical partition member dividing the hutch into separate feed compartments and provided with a groove in its upper edge and a trough provided with a downwardly extending portion adapted to slide in said groove and to be supported by said partition member.

4. In a hutch of the class described, a vertical partition member dividing the hutch into separate feed compartments and provided with a groove in its upper edge, a trough provided with a downwardly extending portion adapted to slide in said groove and to be supported by said partition member and a stationary hay rack mounted over said trough and forming a partititon for the upper portion of said hutch.

5. In a feeding apparatus, a stationary feed rack having accessible feed portions at its opposite lateral sides, a guide means positioned below said feed rack dividing the space below the same into separate feed compartments and extending longitudinally therewith, and a wide feed trough longitudinally slidably mounted on said guide means and extending below the accessible portions at the opposite sides of said feed rack.

6. In a feeding apparatus, a feed rack accessible to animals, a narrow supporting means positioned below said feed rack longitudinally therewith and dividing the space below the same into separate compartments with its upper edge in close proximity thereto, and a feed trough slidably mounted on said supporting means below said feed rack.

In testimony whereof, I have hereunto set my hand at Los Angeles, California, this 12th day of April, 1926.

JOHN K. DOLAN.